July 6, 1954  H. C. MAY  2,682,890
SAFETY VALVE DEVICE
Filed July 27, 1951

INVENTOR.
Harry C. May
BY
Frank E. Miller
ATTORNEY

Patented July 6, 1954

2,682,890

UNITED STATES PATENT OFFICE 2,682,890

SAFETY VALVE DEVICE

Harry C. May, East McKeesport, Pa., assignor to Westinghouse Air Brake Company, Wilmerding, Pa., a corporation of Pennsylvania Application July 27, 1951, Serial No. 238,796

1 Claim. (Cl. 137—471)

This invention relates to fluid pressure relief valves and more particularly to safety valve devices of the poppet type used in fluid pressure apparatus.

The principal object of this invention is to provide an improved safety valve device which is capable of operation without noise resulting from pulsating pounding, or vibration, of the valve thereof on its seat.

Other objects and advantages will appear in the following more detailed description given in connection with the accompanying drawing, wherein.

Figure 1:
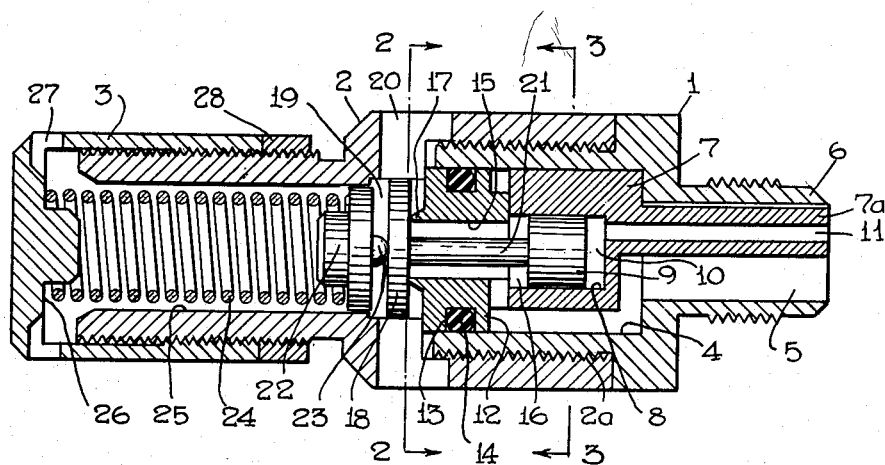
Fig. 1 is a vertical sectional view of a safety valve device embodying the invention.
Figure 2:
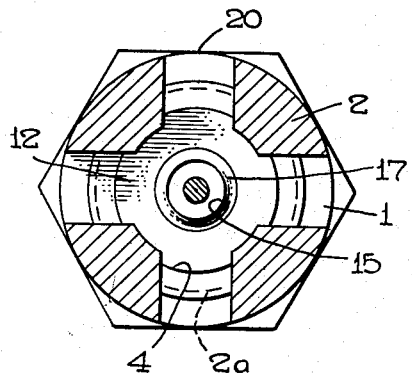
Fig. 2 is a sectional view taken on the lines 2—2 of Fig. 1.
Figure 3:
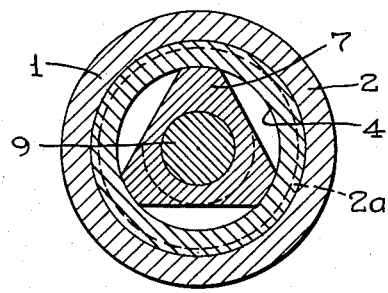
Fig. 3 is a sectional view taken on the lines 3—3 of Fig. 1.

In the embodiment shown, the safety valve device comprising a valve body 1, a spring housing 2, and a cap 3.

Provided in the body 1 is a bore 4 which may communicate by way of a passageway 5 at the outer end of said bore with a reservoir (not shown), or other fluid pressure element or port to be vented, in which reservoir or port the body is arranged to be mounted by means of an integral pipe-threaded nipple 6.

A cylinder member 7 disposed at the outer end of bore 4 in abutting engagement with the end wall of the bore has formed therein a cylinder 8 in which a piston 9 is operably mounted for reciprocation therein. At the right-hand side of piston 9, as viewed in Fig. 1, is a chamber 10 which is in constant communication with the aforementioned reservoir or fluid pressure element (not shown) by way of a passageway 11 formed in the cylinder member 7 and an extension 7a thereof which projects through passageway 5 to the mouth thereof. A valve seat member 12 disposed at the inner end of bore 4 is adapted to abut the cylinder member 7 for the purpose of holding the cylinder member in the position shown. The valve seat member 12 has formed about its periphery a groove 13 in which an annular sealing ring 14 is pressed between the walls of the groove and the wall of the bore 4. This contact, together with the frictional contact of the periphery of the member 12 with the wall of the bore 4, serves to retain the member in the position in which it is shown in Fig. 1.

Formed in the valve seat member 12 in coaxial alignment with cylinder 8 is a through bore 15 having one end open to bore 4 by way of a chamber 16 and the other end encircled by a valve seat 17 adapted to be engaged by a disc valve 18 disposed in a chamber 19 which is constantly open to atmosphere through ports 20 in the spring housing 2 which is secured in the body 1 by screwthread means 2a.

As shown in the drawing, the valve 18 is engaged on its under, or inner, side by a piston stem 21, formed integral with piston 9, for the purpose of unseating said valve.

The valve 18 is constantly engaged on its opposite side by a follower 22 which is contained in the spring housing 2 and is provided with an integral wearing button 23 for contact with said valve. A spring 24 is also contained in a chamber 25 in housing 2 which at one end engages a spring seat 26 formed in the cap member 3 and at the other end follower 22 so as to constantly urge valve 18 toward its seated position as shown. The chamber 25 in housing 2 is constantly open to atmosphere through ports 27 in cap member 3.

Mounted on the threaded portion of the spring housing 2 inwardly of the cap portion 3 is a jam nut 28 which may be utilized to lock the cap portion 3 in a proper adjusted position for obtaining the proper compression on spring 24 and thus the proper setting for the unseating of the valve 18.

In operation, when the pressure of fluid in the reservoir, or port to be vented, and thus in passageway 5 and bore 15 acting over the exposed area of the one face of valve 18 is sufficient to overcome the opposing pressure on the opposite face of said valve of the spring 24 which has been adjusted to the desired venting pressure, the valve 18 will be moved by the preponderance of fluid pressure in bore 15 away from the seat 17. When the valve 18 is moved away from seat 17 slightly, fluid under pressure will then flow past the seat into chamber 19, and thence through passageways 20 to atmosphere.

It should be noted that prior to the unseating of valve 18 the fluid pressures acting on opposite faces of the piston 9 are equal and therefore piston 9 exerts no force in either direction. However, upon valve 18 being unseated there is a localized drop in fluid pressure acting on the left-hand face of piston 9, as viewed in Fig. 1 of the drawing, resulting from the flow of fluid under pressure through bore 15 to atmosphere while the pressure acting on the right-hand face of the piston remains substantially at reservoir pressure by reason of the direct communication to chamber 10 through passageway 11.

It should also be noted that the area of valve 18 over which fluid pressure acts when the valve is seated is appreciably less than the area of either face of piston 9 which is subject to fluid pressure. Consequently, immediately after unseating of valve 18, the excess of pressure acting on the right-hand face of piston 9 through the medium of stem 21 augments the force acting in a direction for moving the valve further away from its seat 17. Thus a prompt and positive movement of valve 18 to its extreme open position is obtained by the action of reservoir pressure in chamber 10 on piston 9. With the valve 18 unseated fluid under pressure in the reservoir will flow to atmosphere through passageway 5, bore 4, chamber 16, bore 15, chamber 19 and ports 20.

The valve 18 will be held off the seat 17 by the preponderance of fluid pressure in chamber 10 acting on the piston 9 until the pressure of fluid in the reservoir and thus in passage 11 and chamber 10 drops to a degree which will permit spring 24 to prevail again and return valve 18 to seat 17. Upon seating of valve 18 the opposing fluid pressures in chambers 10 and 16 acting on piston 9 are again equalized.

It should be noted that the area of valve 18 over which fluid at reservoir pressure acts when the valve is seated is appreciably less than that of the opposite end faces of piston 9 that are subject to opposing fluid pressures. Consequently, the reservoir pressure will now have to increase to a degree which will exert sufficient force on the enclosed area, or non-atmospheric portion, of valve 18 to again overcome the force of spring 24, whereupon fluid in chamber 10 at reservoir pressure will act over the greater area of piston 9 to actuate the valve to its extreme open position.

From the foregoing it can be seen that I have provided a safety valve device which employs novel fluid pressure means whereby valve 18 thereof is held positively in either its closed or extreme open position and undesired pulsating and noise will be eliminated. Moreover, by virtue of passageway 11 pressure in chamber 10 will always equal that in the reservoir to provide for positive control of closing of valve 18 by reservoir pressure instead of the lower pressure which will be present in passage 5 and bore 15 while fluid is being vented through said passage and past said valve. Still further, the passageway 11 being provided in the extension 7a of element 7, which extension is within the nipple 6, provides for making both connections (via passageways 5 and 11) to a reservoir merely by attachment of said nipple.

Having now described my invention, what I claim as new and desire to secure by Letters Patent, is:

A safety valve device comprising two tubular casing portions separably secured together in coaxial relation, one casing portion comprising at one end a nipple and having an axially extending cylindrical chamber open at one end to the opposite end of said one casing portion and also having a cylindrical passage smaller in diameter than said chamber connecting the opposite end of said chamber with the outer end of said nipple, the other of said casing portions having an axially extending passage therethrough and also having a radially extending passage therethrough in such position that said one end of said cylindrical chamber in said one casing portion opens into said radially extending passage in said other casing portion in the assembled condition of said casing portions, an element adapted to be inserted in said cylindrical chamber into contact with said opposite end of said cylindrical chamber prior to assembly of the two casing portions and comprising a tubular extension which extends from said chamber through the said cylindrical passage to the outer end of said nipple, said element having therein a cylindrical chamber open at one end to the cylindrical chamber in said one casing portion and open at the other end to said tubular extension, a valve seat disc also adapted to be inserted in the said cylindrical chamber of said one casing portion into contact with said element prior to assembly of the casing portions to each other and having sealing engagement with the wall of the last named chamber, said valve seat disc and said element being clamped in the said cylindrical chamber of said one casing portion by said two said casing portions when secured together, said valve seat disc having an axially extending passage therethrough open at one end to the open end of said chamber in said element and at the other end to said radially extending passage and defining with said element a port connecting the passage in said valve seat disc to said cylindrical chamber in said one casing portion, an annular valve seat on said valve seat disc surrounding the said other end of said passage in said valve seat disc, a valve adapted to seat on said annular valve seat, a piston slidably mounted in said cylindrical chamber in said element, a stem extending through the passage in said valve seat disc connecting said piston to said valve at its inner seated area, a coil spring contained in the said axially extending passage in said other casing portion operable to exert a seating pressure on said valve and a perforated cap adjustably connected to said other casing portion for supporting the outer end of said spring and compressing it.

References Cited in the file of this patent

UNITED STATES PATENTS

| Number | Name | Date |
|---|---|---|
| 1,916,767 | Mason | July 4, 1933 |
| 2,069,522 | Flournoy | Feb. 2, 1937 |
| 2,080,824 | Kane | May 18, 1937 |
| 2,506,737 | Pacquin | May 9, 1950 |